United States Patent

[11] 3,617,347

[72] Inventor Tatsuo Kuratomi
 4-2-18, Hamatake, Chigasaki, Kanagawa Prefecture, Japan
[21] Appl. No. 875,912
[22] Filed Nov. 12, 1969
[45] Patented Nov. 2, 1971
[32] Priority Nov. 19, 1968
[33] Japan
[31] 43/84170

[54] PROCESS FOR THE PRODUCTION OF A SILICON-COATED DIAMOND POWER
1 Claim, 1 Drawing Fig.

[52] U.S. Cl................................................ 117/69,
 51/295, 51/307, 117/100 B, 117/106 A, 117/118,
 118/48
[51] Int. Cl............................................................ C09c 1/68
[50] Field of Search............................................ 117/69, 100
 B, 106 A, 118; 51/295, 307; 118/48

[56] References Cited
UNITED STATES PATENTS
2,925,375 2/1960 Kothen................ 117/106 A X
3,520,667 7/1970 Taylor.................. 117/100 B X

*Primary Examiner*—Ralph S. Kendall
*Attorney*—Otto John Munz

ABSTRACT: The feature of the present invention consists in forming silicon in nascent state on the surface of diamond powder, heating so as to form a thin film of silicon carbide on the bond surface of diamond with the silicon through covalent bonds and then forming silicon in nascent state on said thin film of silicon carbide whereby to form a film of silicon.

PATENTED NOV 2 1971 3,617,347
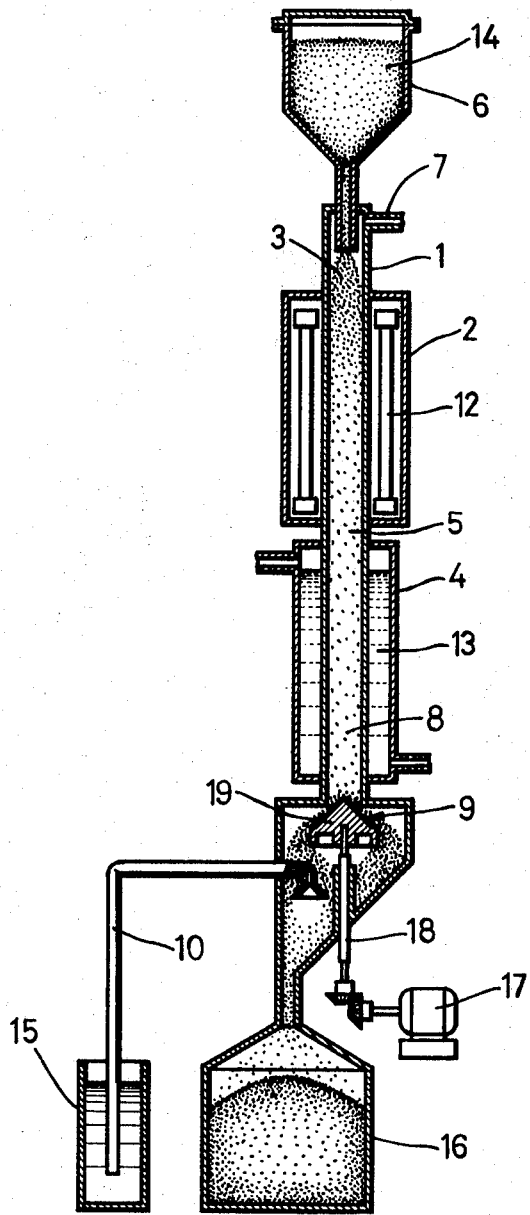
INVENTOR
TATSUO KURATOMI
BY Otto John Munz
ATTORNEY

PROCESS FOR THE PRODUCTION OF A SILICON-COATED DIAMOND POWER

This invention relates to a process for the production of a silicon-coated diamond powder and apparatus therefor.

It is an object of the invention to provide a process whereby the silicon coatings of the silicon-coated diamond powder are made uniform in thickness.

It is another object of the invention to provide an apparatus whereby a silicon-coated diamond powder can readily be formed.

The present invention provides a process whereby a silicon film bonded strongly to diamond powder is formed which thickness is made uniform and an apparatus for carrying out said process.

The feature of the invention consists in, the forming a film of silicon on the surface of diamond powder, forming silicon in nascent state on the surface of diamond powder so as to form a film of silicon on the surface of diamond powder through covalent bonds and simultaneously heating the diamond powder at a temperature sufficient to form a thin film of silicon carbide (SiC) on the bonded surface of the diamond powder and silicon through the covalent bonds of the silicon is nascent state and the diamond powder, whereby to form the covalent bonds of the silicon in nascent state on the surface of diamond powder and to form the thin film of silicon carbide (SiC), and subsequently forming silicon in nascent state on the thin film of silicon carbide.

In forming a film of silicon on the surface of diamond according to the invention, a silicon compound selected from the group consisting of compounds of silicon and hydrogen, compounds of silicon and halogen and compounds of silicon, hydrogen and halogen is used as a silicon source. In the case of using a compound of silicon and hydrogen such as monosilane (SiH$_4$), the silicon compound is subjected to thermal decomposition to form silicon in nascent state. In the case of using a compound of silicon and halogen such as silicon tetrachloride (SiCl$_4$), the silicon compound is subjected to reducing reaction with hydrogen to form silicon in nascent state. In the case of using a compound of silicon, hydrogen and halogen such as trichlorosilane (SiCl$_3$H), the silicon compound is subjected to reactions of thermal decomposition and reduction with hydrogen simultaneously to thus form silicon in nascent state. When such silicon compound is subjected to thermal decomposition reaction or reduction reaction with hydrogen, the silicon compound may be diluted with hydrogen to proceed the reaction to suitable extent and, in the thermal decomposition reaction using a compound of silicon and hydrogen, an inert gas such as argon gas may be used as a diluent.

A feature of the invention lies in that the overall steps for the reaction of forming a silicon film on the surface of diamond powder are carried out in a continuous moving state and the reaction is carried out uniformly on each diamond grain throughout the steps, whereby the silicon films on the diamond powder are made uniform in thickness.

Another feature of the invention lies in that the overall steps for the reaction of forming a silicon film on the surface of diamond powder are carried out in a continuous moving state, wherein, in the first half of the steps, the diamond powder moving continuously is heated to form a silicon film and, in the last half of the steps, the diamond powder moving continuously at a high temperature is cooled to a temperature near the atmospheric temperature at which the silicon film formed on the diamond powder is not oxidized with oxygen in the air, followed by discharging continuously.

The present invention is concerned with a process for the production of a silicon-coated diamond powder and an apparatus therefor, which possess the above mentioned features. The production process will now be illustrated.

Diamond powder and a mixed gas of a gaseous silicon compound such as monosilane (SiH$_4$) of silicon tetrachloride (SiCl$_4$) with hydrogen gas are continuously fed to the upper end of a reaction column where the diamond powder and mixed gas are continuously moved and passed through a heating zone, thus being heated at a desired temperature. In the case where the silicon compound in the mixed gas is a compound of silicon and hydrogen such as monosilane (SiH$_4$), silicon in nascent state is formed according to the thermal decomposition reaction represented by the following chemical equation, $$SiH_4 \rightleftharpoons Si + 2H_2$$

whereby to form a thin film of silicon carbide (SiC) through the covalent bond with carbon atom on the surface of diamond powder, and then silicon in nascent state is formed on the thin film of silicon carbide whereby to form a film of silicon. In the case where the silicon compound in the mixed gas is a compound of silicon and halogen such as silicon tetrachloride (SiCl$_4$), silicon in nascent state is formed according to the reducing reaction with hydrogen represented by the following chemical equation, $$SiCl_4 + H_2 \rightleftharpoons Si + 4HCl$$

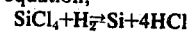

whereby to form a thin film of silicon carbide (SiC) through the covalent bond with the surface of diamond powder, and then silicon in nascent state is formed on the thin film of silicon carbide whereby to form a film of silicon. In order to effect such reactions, it is necessary to heat the diamond powder at a temperature higher than desired. A temperature of about 900° C. is required for decomposing thermally monosilane (SiH$_4$), while a temperature of about 1,000° C. is required for reducing silicon tetrachloride (SiCl$_4$) with hydrogen on industrial scale. Moreover, it is required to heat at a temperature of about 1,350° C. in order to form silicon carbide (SiC) through the covalent bond of silicon in nascent state formed on the surface of diamond powder with carbon atom on the surface of diamond powder.

Therefore, the diamond powder moving continuously in the reaction cylinder is heated at a temperature of higher than 1,350° C. in the heating zone. Since the temperature of the thus resulting silicon-coated diamond powder is very high, that is, higher than 1,350° C., the high temperature silicon-coated diamond moving continuously is cooled while passing through the cooling zone in the reaction cylinder to a temperature of about 100° C. at which silicon is not oxidized even through contacted with oxygen in the air, and then the thus cooled silicon-coated diamond powder is continuously discharged out of the reaction cylinder.

This process is preferably carried out in a reaction cylinder under somewhat superatmospheric pressure so that the air does not enter the reaction cylinder.

The apparatus for carrying out the foregoing process for producing a silicon-coated diamond powder in a continuous moving state will now be illustrated. A main portion of the apparatus is a reaction cylinder the upper half of which serves to heat the diamond powder moving continuously inside the reaction cylinder and is provided with a heating means outside so as to heat the diamond powder moving continuously inside the reaction cylinder up to 1,500° C., and the lower half of which receives the silicon-coated diamond powder moving continuously downwards through the upper half and heated at a high temperature and is provided with a cooling means outside so as to cool the high temperature silicon-coated diamond powder moving continuously inside the reaction cylinder to lower than 100° C.

In addition, the upper end of the reaction cylinder is provided with a feed means for feeding diamond powder continuously to the reaction cylinder and with a feed pipe for feeding continuously a mixed gas of a gaseous silicon compound and hydrogen gas thereto, while the lower end of the reaction cylinder is provided with a discharge means for discharging continuously the silicon-coated diamond powder out of the reaction chamber, which has been subjected to the silicon film forming reaction while moving continuously in the upper half of the reaction cylinder and then cooled at a temperature of about 100° C. in the lower half of the reaction cylinder so as to be stable even in contact with oxygen in the air, said discharge means being so constructed that the pressure of the mixed gas in the reaction cylinder is held higher than the atmospheric pressure and the air is thus not flowed in the reaction cylinder. To the lower portion of the reaction cylinder is further connected an exhaust pipe for exhausting the mixed gas after the thermal decomposition reaction or reducing reaction with hydrogen to release silicon on the surface of diamond powder in the upper half of the reaction cylinder. In the apparatus of the above mentioned construction, a series of steps for making a silicon-coated diamond powder are carried out effectively in a continuously moving state.

The present invention will further be illustrated by the accompanying drawing in which the FIGURE shows a cross-sectional schematic view of one embodiment of apparatus suitable for the practice of the invention.

1 is a reaction cylinder constituting a main body of our apparatus the upper half of which is provided with heating means 2 so as to heat diamond powder 3 moving continuously at a temperature of from 1,000° to 1,500° C., heating means 2 having heating element 12. The lower half of reaction cylinder 1 is provided with cooling means 4 for cooling silicon-coated diamond powder 5 at a high temperature from the upper half of reaction cylinder 1 to a temperature of about 100° C., 13 being cooling water of cooling means 4. At the upper end of reaction cylinder 1 are provided feed means 6 for feeding continuously diamond powder to reaction cylinder 1 and feed pipe 7 for feeding continuously a mixed gas of monosilane (SiH$_4$) and hydrogen gas, silicon tetrachloride (SiCl$_4$) and hydrogen gas or trichlorosilane (SiHCl$_3$) and hydrogen gas. On the other hand, at the lower end of reaction cylinder 1 is provided discharge means 9 for discharging continuously silicon-coated diamond 8 cooled in the lower half of reaction cylinder 1. Discharge means 9 has a damper 19 moved vertically by shaft 18 driven by motor 17, said damper being such as to control the clearance from the bottom of reaction cylinder 1.

As the silicon-coated diamond powder is continuously discharged from the discharge means and the diamond powder in reaction cylinder 1 lowers correspondingly, new diamond powder 14 is fed continuously to reaction cylinder 1. To the lower end of reaction cylinder 1 is connected exhaust pipe 10 for exhausting continuously the mixed gas finishing the reaction in reaction cylinder 1, the lower end of exhaust pipe 10 being opened in water 15 so as to prevent the air from entering reaction cylinder 1. A vessel 16 is further provided to the bottom of reaction cylinder 1 so as to store the finished diamond powder.

The following examples are given in order to illustrate the invention in detail without limiting the same, wherein the method of making a silicon-coated diamond powder according to the invention is carried out by the use of the apparatus of the invention.

EXAMPLE 1

A diamond powder having a grain size of 3 microns or less is used and subjected to silicon coating. As a source of silicon for coating diamond powder, a compound of silicon and hydrogen, monosilane (SiH$_4$) is used. The diamond powder is heated at a high temperature of 1,350° C. and contacted with a mixed gas of monosilane diluted with hydrogen gas, thereby thermally decomposing monosilane on the surface of diamond powder as shown by the chemical equation, SiH$_4 \rightarrow$ Si+2H$_2$ and binding the thus resulting silicon in nascent state with carbon of tee surface of diamond powder through covalent bonds to form a thin film of silicon carbide (SiC), although the thermal decomposition of monosilane is effected at 900° C. In this mixed gas, hydrogen gas is added so that the proportion of monosilane to hydrogen gas is 0.25 percent by volume. Under such conditions, the diamond powder is heated at a temperature of 1,350° C. while moving continuously through the heating zone in the upper half of the reaction cylinder, contacted with the mixed gas of monosilane (SiH$_4$) and hydrogen to thus form a silicon film of about 0.5 micron in thickness on the surface of diamond powder, then cooled to 100° C. while the thus resulting high temperature silicon-coated diamond powder being passed through the cooling zone in the lower half of the reaction cylinder, and discharged continuously out of the reaction cylinder.

In the thus obtained silicon-coated diamond powder, a silicon film is strongly bonded to the surface of the diamond powder, the silicon films having a uniform thickness on every diamond grain.

EXAMPLE 2

A diamond powder having a grain size of 3 microns or less is used. As a source of silicon for coating the diamond powder a compound of silicon and chlorine, silicon tetrachloride is used. Since the reaction of releasing silicon from silicon tetrachloride is a reducing reaction of silicon tetrachloride (SiCl$_4$) with hydrogen as shown by the following chemical reaction,

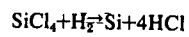

SiCl$_4$+H$_2 \rightarrow$ Si+4HCl it is necessary to bring a mixed gas of silicon tetrachloride and hydrogen into contact with the diamond powder heated at a temperature required for the reducing reaction with hydrogen or higher in order to effect the reducing reaction on the surface of diamond powder. The diamond powder is heated at a high temperature of 1,350° C. and contacted with a mixed gas of silicon tetrachloride and hydrogen, thereby reducing silicon tetrachloride with hydrogen on the surface of diamond powder and binding the thus resulting silicon in nascent state with carbon of the surface of diamond powder heated at the high temperature through covalent bonds to form a thin film of silicon carbide (SiC), although the reducing reaction of silicon tetrachloride with hydrogen is possible at 1,100° C. The proportion of gaseous silicon tetrachloride to hydrogen gas in this mixed gas is 0.2 percent by volume. In such conditions, the diamond powder is heated at a temperature of 1,350° C. while moving continuously through the heating zone in the upper half of the reaction cylinder, contacted with the mixed gas of silicon tetrachloride and hydrogen to thus form a silicon film of about 0.5 micron in thickness on the surface of diamond powder, then cooled to 100° C. while the thus resulting high temperature silicon-coated diamond powder being continuously moved through the cooling zone in the lower half of the reaction cylinder, and discharged continuously out of the reaction cylinder. In the thus obtained silicon-coated diamond powder, a silicon film is strongly bonded to the surface of diamond powder, the silicon films having a uniform thickness on every diamond grain.

As is evident from the foregoing illustration, in the method of forming a silicon film on the surface of diamond powder, a silicon compound selected from compounds of silicon and hydrogen, compounds of silicon and halogen and compounds of silicon, hydrogen and halogen is used as a source of silicon. In the case of using selectively a compound of silicon and hydrogen, monosilane (SiH$_4$), diamond powder is heated at a temperature higher than required for the thermal decomposition of monosilane and monosilane is thermally decomposed on the diamond powder, thus binding the resulting silicon in nascent state with carbon of the surface of diamond powder through covalent bonds. In the case of using a compound of silicon and halogen, silicon tetrachloride (SiCl$_4$) selectively, diamond powder is heated at a temperature higher than required for the reducing reaction of silicon tetrachloride with hydrogen and a mixed gas of silicon tetrachloride and hydrogen is contacted with the surface of diamond powder to reduce silicon tetrachloride with hydrogen, thus binding the resulting silicon in nascent state with carbon of the surface of diamond powder through covalent bonds. Further, in the case of using selectively a compound of silicon, hydrogen and halogen, trichlorosilane (SiHCl$_3$), diamond powder is heated at a temperature higher than required for the thermal decomposition and hydrogen reducing reaction of trichlorosilane and a mixed gas of trichlorosilane and hydrogen is contacted with the surface of diamond powder to effect both the thermal decomposition and reducing reaction, thus binding the resulting silicon in nascent state with carbon of the surface of diamond powder through covalent bonds. In any case, the temperature at which the covalent bond of silicon in nascent state with carbon of the surface of diamond powder is formed is held at higher than required for forming silicon carbide (SiC) through covalent bonds and a silicon film is thus formed. Therefore, the bonding of the formed silicon film to diamond powder is very strong.

Since the operation for forming a silicon film on the surface of diamond powder is carried out in such a manner that diamond powder and a mixed gas of a silicon compound as a source of silicon and hydrogen are continuously moved, the thickness of the silicon film formed on the surface of diamond powder is uniform.

Since the apparatus of the invention for carrying out the method of the invention is provided with, in the upper half portion, a heating means for heating diamond powder moving continuously at a desired temperature while contacting therewith a mixed gas of a silicon compound and hydrogen, in the lower half portion, a cooling means for cooling the high temperature silicon-coated diamond powder to near the ambient temperature, at the upper end of a reaction cylinder, a feed means for feeding continuously diamond powder to the reaction cylinder and a feed pipe for feeding a mixed gas of a silicon compound and hydrogen, and at the lower end of the reaction cylinder, a discharge means for discharging continuously the cooled silicon-coated diamond powder and an exhaust pipe for exhausting the mixed gas of a silicon compound and hydrogen finishing the reaction, in combination, the operation for forming a silicon film in uniform thickness on the surface of diamond powder can effectively be carried out.

What is claimed is:

1. A process for the production of a silicon-coated diamond powder which comprises the steps of moving a diamond powder to be coated continuously in a reaction cylinder, heating the diamond powder at a temperature of 900°–1,500° C. in a heating zone wherein the diamond powder is moved, moving continuously the diamond powder in the reaction cylinder while contacting with a mixed gas of a silicon compound selected from the group consisting of compounds of silicon, halogen and hydrogen with hydrogen gas, effecting the thermal decomposition reaction, reducing reaction with hydrogen or both the thermal decomposition reaction and reducing reaction with hydrogen on the surface of diamond powder heated at the desired temperature in the heating zone whereby to form silicon in nascent state and, simultaneously, a thin film of silicon carbide through covalent bonds of the formed silicon in nascent state with carbon on the surface of diamond powder, then forming silicon in nascent state and silicon film on the thin film of silicon carbide, cooling the high temperature silicon-coated diamond powder to a temperature of lower than 100° C. in a cooling zone while moving continuously the silicon coated diamond powder and mixed gas finishing the silicon releasing reaction in the reaction cylinder, discharging continuously the cooled silicon-coated diamond powder being stable through the cooling at below 100° C. and holding the pressure of the mixed gas in the reaction cylinder higher than the atmospheric pressure constantly, whereby to coat the surface of diamond powder strongly with silicon films in uniform thickness.

* * * * *